UNITED STATES PATENT OFFICE.

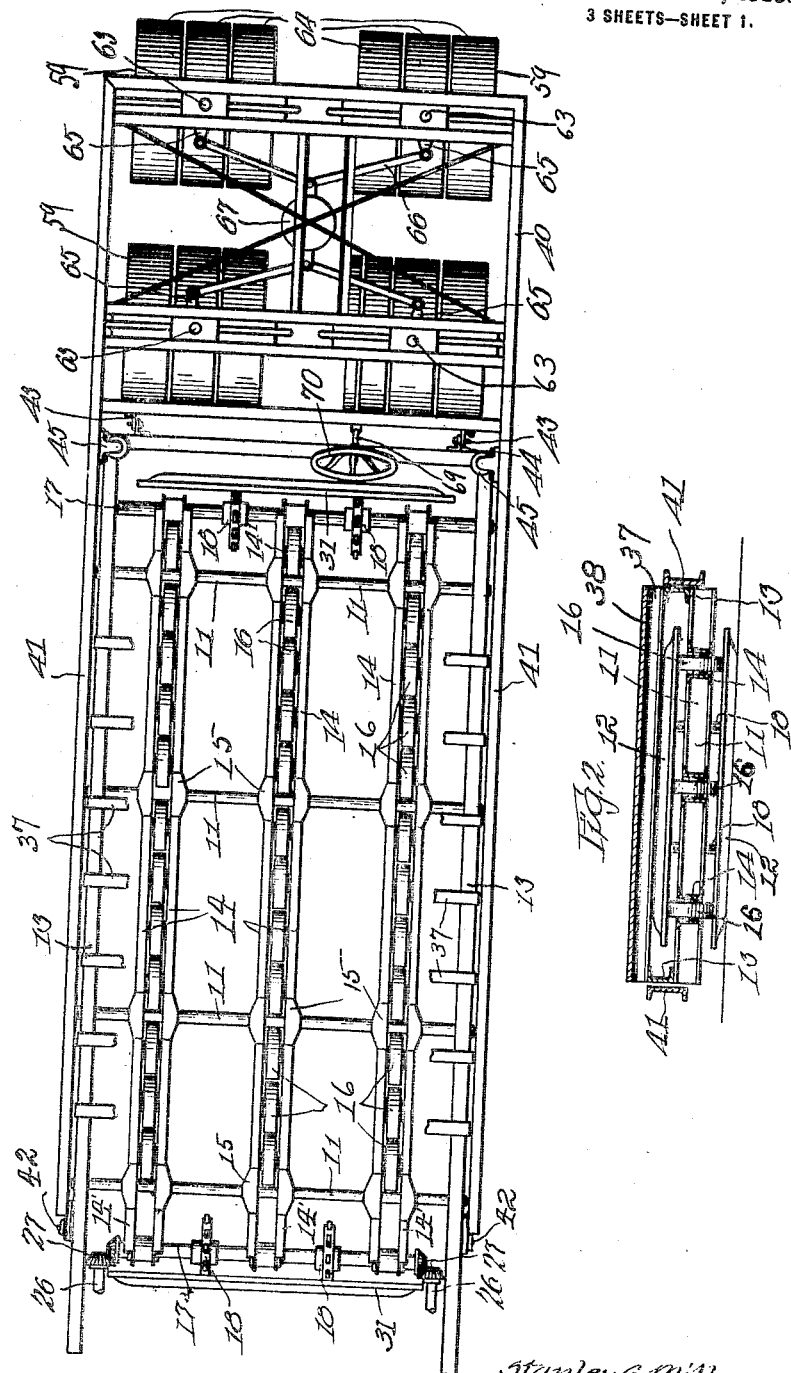

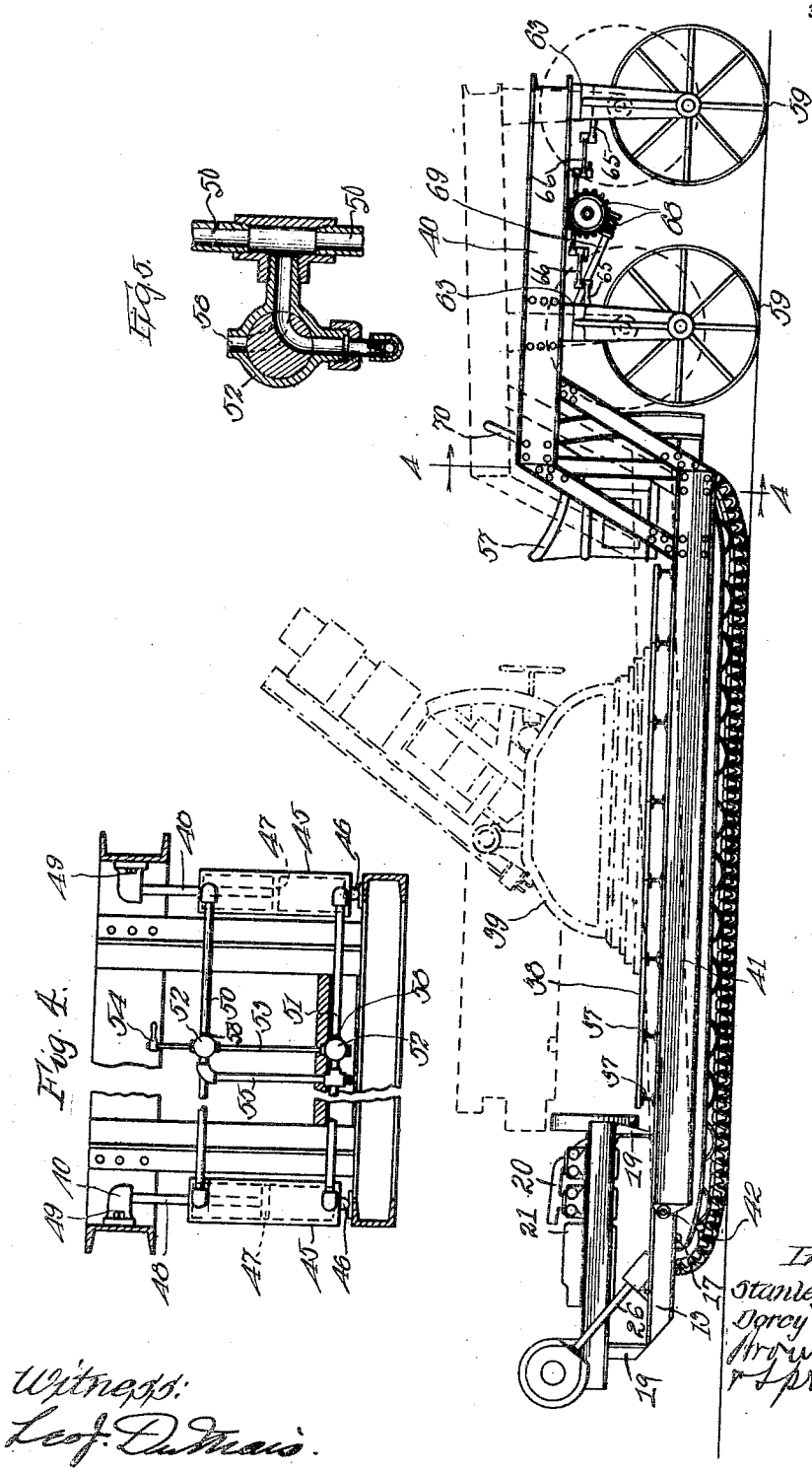

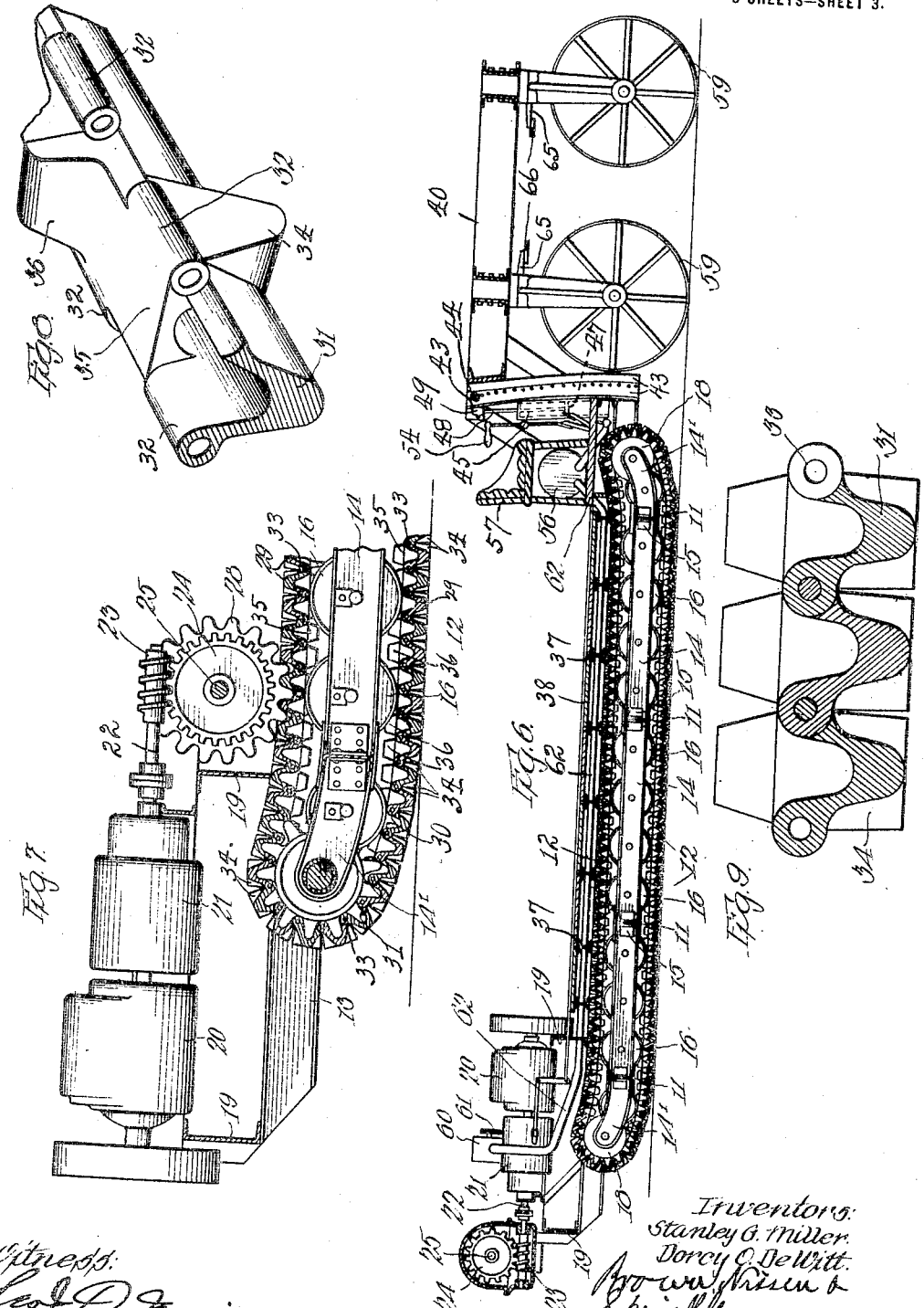

STANLEY GLONINGER MILLER AND DORCY OLEN DE WITT, OF ST. PAUL, MINNESOTA, ASSIGNORS, BY DIRECT AND MESNE ASSIGNMENTS, TO THE GENERAL MACHINERY & INVESTMENT COMPANY, OF ST. PAUL, MINNESOTA, A CORPORATION OF MINNESOTA.

TRACTOR.

1,319,721.         Specification of Letters Patent.       Patented Oct. 28, 1919.

Application filed January 21, 1916. Serial No. 73,435.

*To all whom it may concern:*

Be it known that we, STANLEY GLONINGER MILLER and DORCY OLEN DE WITT, citizens of the United States, residing at St. Paul, in the county of Ramsey and State of Minnesota, have invented a new and useful Improvement in Tractors, of which the following is a specification.

Our invention relates to tractors and has for one of its objects, the provision of a tractor of the character mentioned, capable of climbing over obstructions and irregularities in the surface over which it travels. A further object is the provision of a tractor in which the center of gravity is quite low. A further object is the provision of an improved form of driving gear for operating the traction device from the motive power. A still further object, is the provision of a tractor adapted to travel over very soft and yielding surfaces. Other objects will appear hereinafter.

An embodiment of our invention is shown in the accompanying drawings forming a part of this specification and in which—

Figure 1 is a top view of a tractor embodying our invention with portions removed to show underlying parts.

Fig. 2 is a transverse section of the tractor.

Fig. 3 is a side elevation of the same.

Fig. 4 is an enlarged transverse section taken on line 4—4 of Fig. 3.

Fig. 5 is an enlarged sectional view of a three-way valve used in the construction for controlling the compressed operating fluid.

Fig. 6 is a longitudinal section taken through the tractor.

Fig. 7 is a longitudinal section of the rear end portion of a tractor showing a slightly modified form of driving gears than that shown in Fig. 6.

Fig. 8 is an enlarged perspective fragmental section of one of the tread plates of the tractor belt; and, Fig. 9 is an enlarged section taken transversely through three of the tread plates of the tractor belt.

Our tractor herein set forth is particularly adaptable for military purposes. It forms a suitable mounting and means for carrying large and heavy guns, as well as numerous other materials which it is adapted to transport in military operations. The tractor is so formed that its center of gravity is exceedingly low, thereby adapting it for use on irregular surfaces and where very heavy weights are to be handled. In addition to being adaptable for military purposes, it will be found to be convenient for use in transporting any heavy weights or for use wherever tractors are desirable.

Referring more particularly to the drawings, the tractor is divided generally into two parts, one part consists of a gear or tractor frame on which is mounted the endless tractor belt, the motor, the connecting gearing between the motor and tractor belt and such other articles as it is desired to carry. The other part comprises a main or guiding frame, which is pivoted to the gear or tractor frame and provided with guiding wheels, which are adapted to direct the course of the tractor.

The gear or tractor frame preferably comprises a plurality of cross beams 11, which extend between the upper and lower runs of the tractor belt 12. The extended ends of the beams 11, are secured to the under sides of longitudinally extending beams 13. Between the cross beams 11, are short longitudinally extending beams 14, which are secured rigidly to the cross beams 11, by means of rivets and anchor plates 15, or their equivalent. The cross beams 11 and the short beams 14, form a sort of sub-frame of the tractor frame, which is located between the runs of the tractor belt 12 and serves as a mounting for the tractor belt. The short beams 14, are preferably positioned in pairs close together with bearings formed therebetween, in which are mounted track wheels 16. The sets of beams 14, with their track wheels 16, may be varied in number to suit different requirements. We have shown three sets, as clearly indicated in Figs. 1 and 2, but, this number may be varied for different conditions. On the remote sides of the two outermost cross beams 11, are short beams 14', which are in alinement with the short beams 14, and carry track wheels 16, which are in alinement with the first mentioned track wheels 16. At the ends of the beams 14' are bearings in which are mounted shafts 17. On each of the shafts 17, are two or more gear wheels 18, which operate in the bight portions of the tractor belt 12. One of the shafts 17, is a driving shaft, which together with the gears 18 on such shaft, provide a driving means for the tractor belt.

Across the rear end portions of the longitudinal beams 13, are cross beams 19, which provide sleepers, upon which an internal combustion motor 20 is mounted. We have shown motor 20 as being an internal combustion motor, but, it is understood that any form of motive power may be used when so desired. The motor 20, is provided with a suitable gear box 21, for controlling the speed of the device. The construction of such gear boxes and motors, are well known in the art and no specific description is given herein. Extending from the gear box 21, is a driving shaft 22, which carries a worm 23, which meshes with a worm gear 24. The worm gear 24, is fixed on a shaft 25, which extends across the gear frame and mounted in suitable bearings, not shown. At the ends of the shaft 25, are bevel gears, which mesh with other bevel gears on shafts 26, which latter extend downwardly adjacent to the ends of the driving shaft 17 of the tractor belt. The shafts 26, and said driving shaft 17, are connected together by bevel gears 27, see Figs. 1 and 3.

In Fig. 7 we show a form of driving connection between motor 20 and tractor belt 12 that differs from the form of drive shown in Fig. 6 in that the drive is direct from the worm on the main driving shaft 22 to the main driving gears 28 on drive shaft 25, the gears 28 being in engagement with gear teeth 29 formed on the exterior or ground engaging side of the tractor belt. There may be as many of the gears 28 as may be desired on shaft 25 but we preferably use two of such gears, each located near the outer extremities of the pivoted plates 31 making up the tractor belt 12. In practice we find that this form of driving connection as shown in Fig. 7 is very efficient in dispensing with all bevel gear connections and hence reducing friction and saving power and complications. It is the form of drive that we prefer and recommend and the same constitutes an important part of our invention.

In Figs. 8 and 9, the specific construction of the tractor belt is shown, setting forth the rack teeth construction of the tread plates making up the tractor belt. The tractor belt consists of a plurality of tread plates 31, substantially V-shaped in cross section, having ears 32 along their longitudinal edges. The ears 32 and spaces between such ears, are so formed that the ears on one tread plate fit between and substantially fill the spaces between the ears on the longitudinal edges of the next adjacent tread plates. The ears 32, are perforated and connected together by rods 33, which extend the full lengths of the tread plates 31. This construction provides a means whereby there are substantially dirt tight joints between the tread plates and in which a smooth running and practically noiseless construction is provided. On the ground engaging sides of the tread plates are provided lugs 34, which provide anti-skidding means for the tractor and also provide means for preventing the tread plates from folding together between the track wheels 16, when the tractor passes over small obstructions. On the inner side of the tractor belt, the tread plates 31, are provided with track portions 35, which are small integral bridges extending across the open sides of the tread plates. These track portions are comparatively short and are positioned so that the track wheels 16 pass thereover in the travel of the traction belt. The traction wheels 16 travel on the track portions 35 of the tread plates to support the weight of the tractor and its load on the lower run of the tractor belt. The tractor wheels are higher than the depth of the cross beams 11 and short beams 14, so that the upper run of the tractor belt rests on the tops of the track wheels 16. The track portions 35 of the tread plates, being the only portions of the traction belt which engage the track wheels 16. At the ends, or at other suitable positions on the track portions 35, we provide upstanding lugs 36, which are adapted to engage the sides of the track wheels 16 to guide the traction belt around on the gear wheels 18 and track wheels 16 in operative position in the device.

Resting with their ends on the longitudinal beams 13 and disposed above the traction belt, are a plurality of sleepers 37, which are adapted to support the load on the tractor. On the sleepers 37, we have indicated a flooring 38, and on this flooring a gun 39, or any other preferred load, is indicated. It will be understood, however, that the sleepers 37 and floor 38, may be varied to suit different requirements to which the device may be put.

In order to render the guiding of our tractor easy, we have provided a main or guiding frame, which comprises a substantially rectangular portion 40, having two rearwardly extending beams or bars 41 rigidly secured thereto. The beams or bars 41, extend rearwardly along the sides of the longitudinal beams 13 and are pivoted, as at 42, to said beams near the rear ends of the latter, as clearly indicated in Figs. 1 and 3. On the rectangular portion 40, of the guiding frame and the front end of the traction frame, we provide guides 43, which prevent relative lateral movements of the guiding and traction frames, but, permit relative vertical movements concentric with the pivotal points 42. In order to provide means for locking the guiding and traction frames against relative vertical movements, a suitable lock is provided. We have shown the guides 43 perforated and pins 44 inserted in certain of the holes to lock the guide portions against relative movement. This forms a simple locking means and any other locking means may be provided when so desired.

In order to effect relative vertical movements of the front end portions of the guiding and traction frames about the pivotal points 42, we provide mechanism for accomplishing such movements. In the present instance pneumatically operating means are employed. This means comprises a cylinder 45, pivotally secured to each front corner of the traction frame, as at 46, Fig. 4. In each cylinder 45, is operatively mounted a piston 47. Each piston 47, is provided with a piston rod 48 and the latter pivotally secured at its upper end to a casting 49 secured on the part 40 of the guiding frame, as clearly shown in Fig. 4. A pipe 50, is connected at its ends to the top ends of the cylinders 45, and the ends of a pipe 51 are connected to the lower ends of said cylinders. Intermediate the ends of each of the pipes 50 and 51, is connected a three-way controlling valve 52, and the valves 52 connected together by a rod 53, so that the valves will be operated simultaneously by a manually operable lever 54. The two valves 52, are supplied from a manifold 55, which is connected to a supply tank 56, under the driver's seat 57, or some other suitable position. The arrangement of the valves 52, is such that when fluid is being passed from tank 56 into the cylinders 45, above the pistons 47, the upper valve 52, see Fig. 4, will be open to permit the flow of fluid into the upper portions of the cylinders and the lower valve 52, in said figure, will be open to the outside atmosphere, permitting fluid in the lower portions of the cylinders, below the pistons 47, to pass out of the discharge opening 58 of the lower valve 52. In a like manner, when the lower valve 52 is open to permit the flow of fluid into the lower portions of the cylinders 45, upper valve 52, will be open to the outside atmosphere to exhaust fluid from the upper ends of the cylinders 45, as will be readily understood upon reference to Figs. 4 and 5. The arrangement is such, that when fluid is passed into the upper ends of the cylinders 45, pressure will be exerted against the inner sides of the upper ends of the cylinders 45, to raise the front end of the tractor frame and support its weight on the front end of the guiding frame. When fluid under pressure is passed into the lower portions of cylinders 45, an upward pressure will be exerted on the lower sides of pistons 47, thereby pressing the pistons 47, piston rods 48 and the front end of the guiding frame upwardly. With this arrangement, when the guiding wheels 59, have been brought up to an obstruction, fluid is admitted to the lower portions of the cylinders 47 to raise the guiding wheels 59 above the height of the obstruction. The tractor is then moved forwardly on the traction belt 12, until the guiding wheels 59 are brought over the obstruction. Then by admitting fluid under pressure to the upper portions of the cylinders 45, the front end portion of the tractor frame with the tractor belt, is lifted until the front end of the tractor belt is as high as the obstruction, when the machine is brought forwardly, until the front end of the tractor belt climbs onto the obstruction. The guiding wheels 59 are lowered after passing over the obstruction and the machine moved forwardly, until the entire tractor belt has passed over the obstruction. With this construction, our tractor may be passed over fallen trees, uneven roadways, ditches, fences, and the like. The fluid used to operate the raising and lowering devices for the front ends of the guiding and traction frames, may be compressed in tank 56, or its equivalent, in any suitable manner. We have shown a compressor 60, operated by a chain 61, from the gear box 21, and connected by means of a pipe 62, with the tank 56. However, any other suitable means may be employed for compressing the fluid.

The front end of the frame part 40 of the guiding frame, is preferably supported on a plurality of guiding wheels 59. Each of the guiding wheels 59 is swiveled, as at 63, to a suitable portion of the frame 40, as clearly indicated in Fig. 1. In the drawings, we have indicated four guiding wheels 59, however, this number may be varied to suit different requirements. The wheels 59, may be formed in sections 64, when so desired, or in any other suitable manner, the object being to provide wide ground engaging surfaces to prevent the wheels from settling or cutting into soft yieldable surfaces. Each of the mountings of the ground wheels 59, is provided with an arm 65, which is connected by means of a connecting link 66, to a member 67, which is pivoted at or near the middle of the frame part 40. The member 67, is operated through a gear 68, a shaft 69, and a hand wheel 70, which is mounted in any convenient position to the operator's seat 57, mounted on the front end portion of the tractor frame.

While we have illustrated and described the preferred construction of our invention, we do not desire to be limited to the precise details set forth, but, desire to avail ourselves of such variations and changes as come within the scope of the appended claims.

We claim:—

1. In a tractor the combination with a frame, a plurality of track wheels journaled to rotate in said frame, said track wheels being of substantially uniform size throughout and arranged in a plurality of rows spaced apart and extending longitudinally of the frame, an endless track comprising a plurality of elongated tread plates hingedly connected together and encompassing said track wheels, each of said track wheels resting upon the lower run of the endless track and supporting thereon the weight of the frame and parts carried thereby, the upper run of the track engaging the upper periphery of each of the track wheels and being carried thereby, a motor, and means for operating the endless track in relation to the track wheels from the motor.

2. A tractor comprising a frame; an endless track mounted in the frame; a motor on the frame; and a gear connected with the motor and engaging the outer and ground-engaging side of the track providing a driving connection between the motor and track.

3. A tractor comprising a frame; an endless track mounted in the frame; a motor on the frame; a gear mounted above the track in the frame and meshing with the outer and ground-engaging side of the track; and a driving connection connecting the motor with said gear.

4. A tractor comprising a frame, wheels spaced apart and journaled in the frame, an endless track, the extremities of the runs of which are mounted to travel upon said wheels, there being tooth engaging portions on the track accessible from the outer and ground engaging side thereof, a driving gear mounted outside of the periphery of said track and meshing with said tooth engaging portions of the track between said wheels, anti-friction means for supporting the runs of said track adjacent the point of contact of said driving gear therewith, and a motor operatively connected with said driving gear.

5. In a tractor the combination with a frame, a plurality of track wheels journaled to rotate freely in said frame, said track wheels being of substantially uniform size throughout and arranged in a plurality of rows spaced apart and extending longitudinally of the frame, an endless track comprising a plurality of elongated tread plates hingedly connected together and encompassing said track wheels, said tread plates being provided with tooth engaging portions accessible from the exterior of said endless track, each of said track wheels resting upon the lower run of the endless track and supporting thereon the weight of the frame and parts carried thereby, the upper run of the track engaging the upper periphery of each of the track wheels and being carried thereby, a motor mounted on the frame, a gear for operating the endless track in relation to the track wheels, said gear being mounted on the frame on the exterior of the endless track and normally engaging the tooth engaging portions of the tread plates, and operative connections between the motor and said gear.

In testimony whereof we have signed our names to this specification, in the presence of two subscribing witnesses, on this 5th day of January A. D. 1916.

STANLEY GLONINGER MILLER.
DORCY OLEN DE WITT.

Witnesses:
STANLEY F. MILLER,
ALEX C. NICHOLSON.